United States Patent [19]

Heinz

[11] 4,295,710
[45] Oct. 20, 1981

[54] DEFORMABLE MIRROR WITH DITHER

[75] Inventor: Theodore A. Heinz, Simi Valley, Calif.

[73] Assignee: Rockwell International Corporation, El Segundo, Calif.

[21] Appl. No.: 71,898

[22] Filed: Sep. 4, 1979

[51] Int. Cl.³ .............................. G02B 7/18; G02B 5/08
[52] U.S. Cl. ...................................... 350/310; 350/295; 350/289
[58] Field of Search ................ 350/295, 310, 289, 285

[56] References Cited

U.S. PATENT DOCUMENTS

| | | | |
|---|---|---|---|
| 3,880,500 | 4/1975 | Kojabashian | 350/310 |
| 4,060,314 | 11/1977 | Heinz | 350/285 |

FOREIGN PATENT DOCUMENTS 42426  10/1959  Poland .................................. 350/310

OTHER PUBLICATIONS

Hardy, John W., *Active Optics: A New Technology* . . . *Proc. of the IEEE*, vol. 66, No. 6, Jun., 1978.

*Primary Examiner*—Jon W. Henry
*Attorney, Agent, or Firm*—H. F. Hamann; Harry B. Field

[57] ABSTRACT

A multi-actuator deformable mirror and control system which comprises a copper-surfaced, aluminum faceplate supported by a flexure strut attached to an aluminum-backed structure and actuated by nineteen differential ball screw mirror actuator assemblies. The actuators are driven directly by direct current stepping motors capable of 400 steps/rev when operating in "half step" mode. A 10μ meter per revolution differential pitch in the screw provides a resolution of 1μ inch per motor step. An alternating current dither actuator comprising a plurality of piezo-ceramic elements is connected one each in series with said actuator assemblies for providing both tagging and real time dynamic corrections.

9 Claims, 3 Drawing Figures

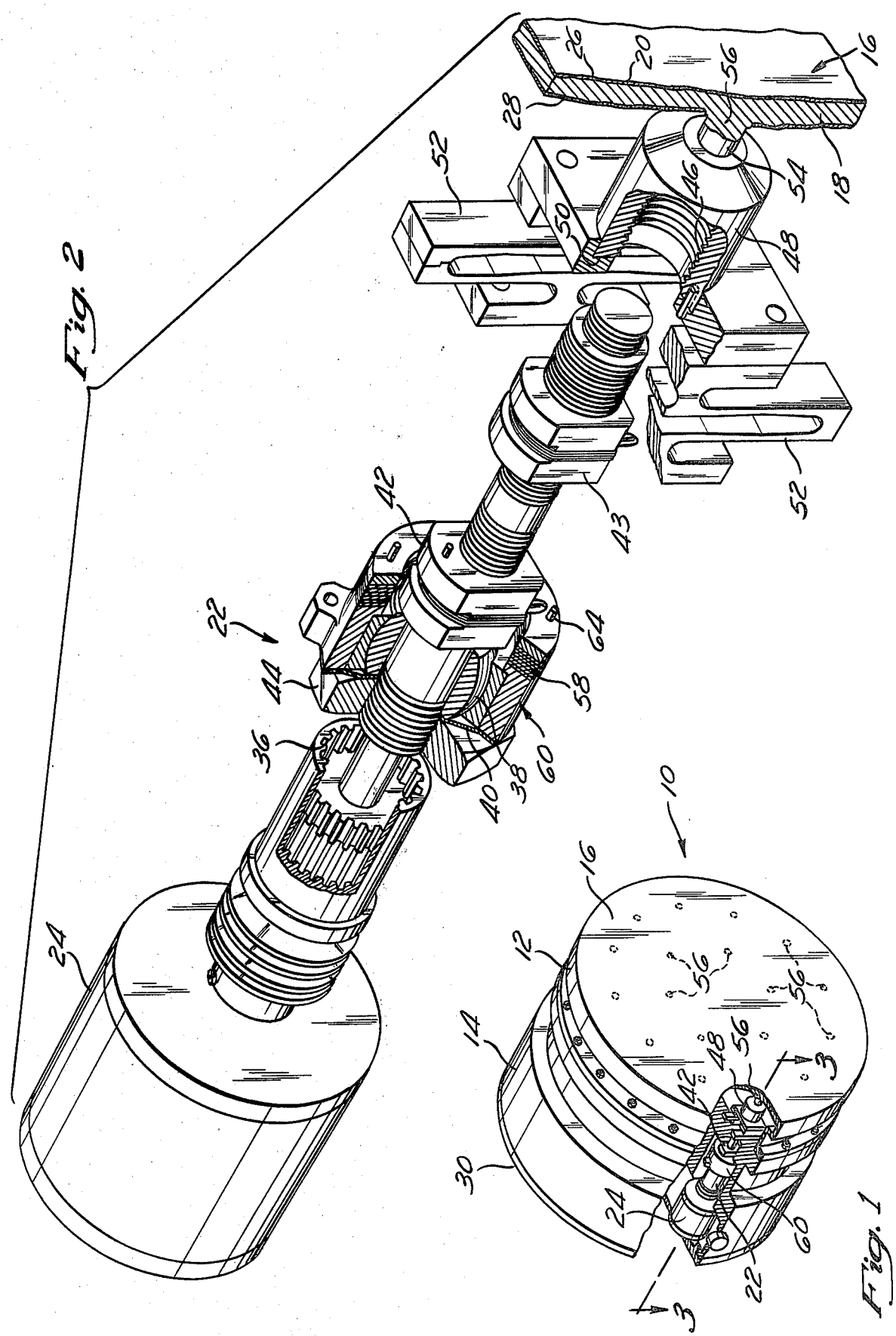

DEFORMABLE MIRROR WITH DITHER

BACKGROUND OF THE INVENTION

1. Field of the Invention

This invention relates to deformable mirrors for use in laser systems and more specifically to a multi-actuator deformable mirror that will cancel laser wavefront phase errors caused by the quasi-static aberrations occurring in large aperture metal mirror optics.

2. Description of the Prior Art

Large aperture high power laser resonator and beam transport optics, particularly metal mirrors and salt windows, produce quasi-static wavefront aberrations that reduce output beam quality and thus target irradiance. There exists physical and economic limitations on the primary optical quality obtainable in these elements as well as a high probability of subsequent reduction of quality due principally to material creep, and thermal or mounting distortions. Therefore, it is reasonable to consider the use of a quasi-static deformable mirror in the optical train as a wavefront error correction device to maximize target irradiance.

Other mirror systems such as those described in U.S. Pat. Nos. 4,060,314; 4,060,315; 3,967,899; and 3,904,274 describe mirror mounts, piezoelectrically-driven and ball screw-driven devices; however, nowhere is there described a multi-actuator deformable mirror with dither which comprises a copper-surfaced, aluminum faceplate supported by an aluminum back structure, actuated by nineteen differential ball bearing screws, and driven by stepping motors capable of 400 steps/rev when operating in "half step" mode.

SUMMARY OF THE INVENTION

Accordingly, there is provided a multi-actuator deformable mirror for correcting wavefront aberrations in a laser fusion optical system which comprises a copper-surfaced aluminum faceplate supported by a plurality of ball screw mirror actuator assemblies. Each actuator assembly acts in cooperation with a flexure support member, a dither actuator, and a stepping motor to provide both tagging as well as real time dynamic correction.

OBJECTS OF THE INVENTION

Therefore, it is an object of the present invention to provide a mirror which has a clear aperature of 35 cm.

Another object of the present invention is to provide a deformable mirror which has 19 differential ball screw actuators in a hexagonal array to provide wavefront error correction.

Yet another object of the present invention is to provide a deformable mirror wherein surface deformation attainable at each actuator location is at least $\pm 20\mu$ meters from nominal figure, independent of adjacent actuator position.

Still a further object of the present invention is to provide a deformable mirror which is capable of maintaining a selected figure for long periods without control to maximize system and test reliability.

Another object of the present invention is to provide a mirror actuation means which is readily adaptable to fully automatic control for use in multibeam installations.

Yet another object of the present invention is to provide a mirror actuation means which is capable of open loop control providing additional test and preparation flexibility.

Still another object of the present invention is to provide a mirror actuation means which is capable of operating a bandwidth of at least $\pm 20\mu$ meters at D.C. to 1 Hz.

Yet another object of the present invention is to provide mirror actuation means having a displacement precision resolution of $\lambda/40$ (1 $\mu$in.) to assure compatibility with both present and future requirements.

Still a further object of the present invention is to provide a mirror actuation means (ball screw/flexure) which is fully developed and demonstrated to minimize development costs and risks.

Yet a further object of the present invention is to provide mirror actuation means which is compatible with the existing control format and optical system used in multi-beam systems.

Another object of the present invention is to provide a mirror surface which is of OFHC copper material to assure compatibility with an optical energy flux of $\geq 5$ J/Cm$^2$ in a 1 $\mu$s pulse and has a reflectivity of at least 98 percent with a surface roughness less than 80 Å rms.

Still another object of the present invention is to provide a deformable mirror assembly which weighs less than about 125 pounds.

Other objects advantages and novel features of the present invention will become apparent from the following detailed description of the invention when considered in conjunction with the accompanying drawings.

BRIEF DESCRIPTION OF THE DRAWINGS

FIG. 1 is a perspective view, partially cutaway, of the preferred embodiment of the deformable mirror with dither.

FIG. 2 is a perspective view, partially cutaway, of the ball screw actuator with dither.

DESCRIPTION OF THE PREFERRED EMBODIMENTS

Figure 3:
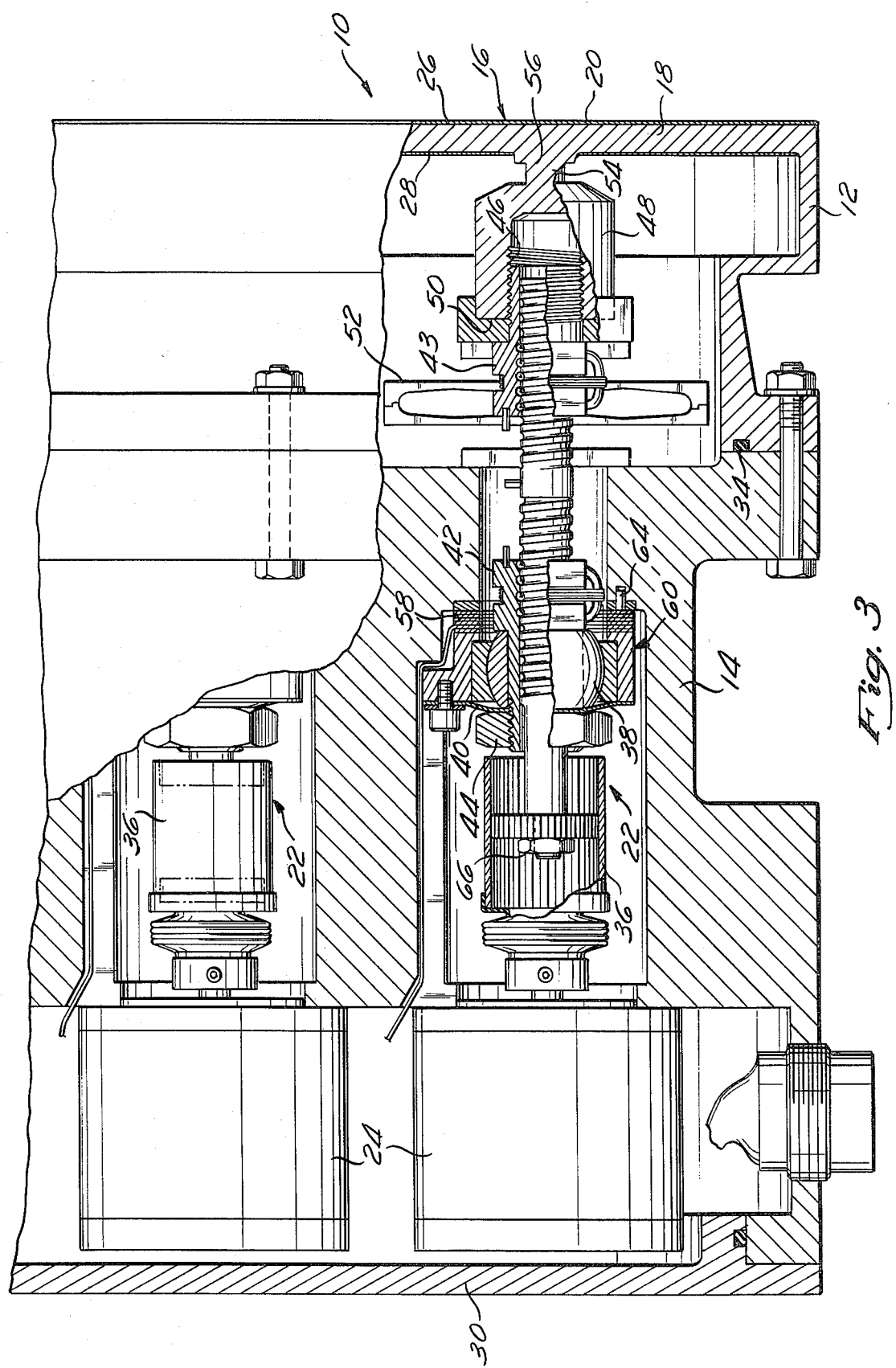
FIG. 3 is a cross-sectional view of one quadrant of the present invention.

Referring now to FIGS. 1 and 2, there is shown a cutaway view of the deformable mirror assembly generally designated 10. The mirror assembly 10 comprises faceplate 12 supported by housing 14. The faceplate 12 preferably comprises a reflecting surface generally designated 16 which includes a substructure 18 and coating 20. The faceplate 12 has a drive means a plurality of mirror actuator assemblies generally designated 22, wherein each assembly 22 is in combination with a stepping motor 24. This combination acts to deform reflecting surface 16 relative to the thick body of support housing 14 and yields an effective pitch of about 10 $\mu$m, while each step of stepping motor 24 yields a surface positioning resolution of about 0.025 $\mu$m.

The relatively thick copper-clad aluminum reflecting surface 16 minimizes the localized effects of actuator loading, thereby providing a smooth elastic curve between actuator assemblies 22. Local stresses are dissipated below the surface of the mirror and stability is improved through the increase in overall faceplate 12 rigidity.

Although any reflective coating will work, in the preferred configuration both the front 26 and rear 28 of the reflecting surface 16 are covered by a 0.010-15-inch thick layer of electroformed copper. The copper coating 20 on the front 26 of reflecting surface 16 ensures compatibility with incident beam energy. The copper coating on the rear 28 of the reflecting surface 16 mitigates bi-metal thermal distortion effects.

The use of an aluminum substructure 18 assures compatibility with an aluminum support housing 14 which was in part chosen to reduce the weight of the assembly to about 125 pounds while providing high rigidity at reasonable cost. However, many other state-of-the-art metals will provide the desired effects.

Referring now to FIG. 3, there is shown the stepping motor 24 in combination with the mirror actuator assembly 22. Any number of stepping motors 24/mirror actuators 22 combinations can be used to drive the reflecting surface 16; however, in the preferred configuration, nineteen stepping motors 24 are used, one each to drive nineteen actuators 22. Each stepping motor 24 is located in its own recess on the back of structure 14. One example of an acceptable stepping motor is the SloSyn M series motors having 200 step/rev "full step" and 400 step/rev "half step" operating capability. Two full turns of the motors are required for full stroke (20$\mu$ meters) requiring a moderate drive velocity in "full step" mode of 800 steps/sec providing a 1 Hz operating band width. These motors can be operated at several thousand steps/sec if desired, with the small torques (<5 in-oz) required to operate the ball screw actuators 22. The large, torque-available-to-torque required, assures high step precision and position repeatability. The use of electronic "back lash" compensation which automatically approaches the end point in the same direction regardless of actuator sense provides deflection precision and repeatability within a fraction of 1 step (1 $\mu$in. "half step", 2 $\mu$in. "full step" mode).

The housing structure 14, FIG. 3, in which the motors 24 are mounted is sealed by a cover plate 30 to prevent contamination of the laser amplifier environment by the materials and oils used within the deformable mirror assembly. A faceplate seal 34 is situated between the faceplate 12 and housing structure 14. The inner mirror cavities are vented by means of a fine mesh (10 micron) filter. This feature prevents distortion which may be produced by pressure differentials across the faceplate 12.

The stepping motors 24, FIGS. 2 and 3, are connected to the ball screw mirror actuators 22 by a sliding multi-toothed spline drive 36 which allows the screw to travel fore and aft (0.5 in. maximum with a 0.100 in.lead) while the motor 24 remains in a fixed position. The screw itself is mounted to the housing 14 through a spherical bearing 38. The spherical bearing 38 is prevented from rotating by a suspension washer 40 that incorporates folded elastic beams which prevent the aft ball nut 42 from turning while permitting normal gimbal action with little resistance. The photochemically etched suspension washer 40 is fixed to the housing 14 by three screws which fix the $\theta$ position of the aft ball nut 42. The relative position of the aft ball nut 42 is adjusted by loosening these screws and rotating the nut-spherical bearing assembly 44. The adjustment thus obtained is equal to the pitch of the aft screw section or $\approx$0.1 inch/rev. This adjustment is used to compensate for all related machining tolerances and greatly reduces the overall precision required in fabrication of the mirror assembly.

Ball nut 43 of the ball screw mirror actuator 22 is attached to the rear 28 of the reflecting surface 16 at each actuator location through a threaded hole 46 in the "integral flex strut" 48. The "integral flex strut" 48 is a machined form at each actuator location which translates actuator displacement to the reflecting surface 16.

The integral flex strut 48 comprises a flat aft surface 50 of the receiving portion which reacts to the loads of the preloading flexures 52 and translates actuator displacements through a carefully designed disc form 54 just under the reflecting surface 16. This disc form 54, or necked-down portion, is sized to prevent unacceptable structural bending moments from being developed in the reflecting surface 16 at actuator attach points 56. The cylindrical shape assures a minimum moment of inertia for the cross-sectional area of the disc 54. Maximum cross-sectional area and minimum length are required to reduce deflection of this structure which must be compensated for by actuator over-travel.

The disc 54 was designed to impose no more than 54 $\mu$rad distortion out of 290 $\mu$rad deflection at a first row actuator location when the center and outer row actuators are at full stroke. The Strehl ratio corresponding to the sum of this induced error was calculated as follows:

$$\text{Strehl Ratio} = 1 + \left(\frac{2\pi}{\lambda}\right)^2 \frac{\Sigma dA\Delta S^2}{\Sigma A}$$
$$= 0.92 \text{ max.}$$

The error is proportional to the bending moment generated within the attach point structure, and the Strehl ratio reduction becomes smaller rapidly as actuator stroke diminishes.

By way of example and not limitation, a summary of anticipated stress for the 0.300 dia.$\times$0.136 in. long disc follows for Ec=$10\times 10^6$ psi (aluminum).

$\theta_{Face}$=290 $\mu$rad max.

M=8.45 in-lbs

P=244 lb $\sigma$ Bending in disc=$\pm$3000 psi max $\sigma$ Bearing in disc=$\pm$3400 psi max $\sigma_{Total}$=$\pm$6400 psi max Strain Due to Bearing=$\pm$47 $\mu$in.

A stand-off thickness between the back of the reflecting surface 16 and the machined disc 54 is provided to ease machining and provide additional thickness for dissipation of strains generated at the attach point.

The ball screw mirror actuators 22, FIG. 2, are preloaded in tension by a pair of machined 17-4 PH flexures 52 at each actuator location. Flexure loads are reacted by Cres plates mounted on the "integral flex strut" 48 and by posts machined as part of the housing structure 14. In addition to providing the potential force required to deform the reflecting surface 16, the flexure preload 52 is important in obtaining precision performance from the differential ball screw mirror actuators 22.

Differential recirculating ball screw actuators 22 used in mirror mounts have consistently demonstrated a precision of better than 1 $\mu$in. This performance is obtained with machined surfaces no better than 16 $\mu$in. rms. The actuators 22 are relatively insensitive to oil films and contaminates such as surface dirt. This behavior is obtained by properly preloading the screw such that deflection anomalies are averaged out over a larger number of balls. Part of the flexure preload is relegated to this function. In addition, the preload also eliminates back lash from the actuator assembly 22. A maximum back lash of 0.50 degrees or 0.5 $\mu$in. actuator motion caused by clearance in the drive spline 36 is anticipated for this mirror assembly.

Although the preloaded ball nut 42 is quite stiff when subjected to moments (2 μrad/in-lb nominal) the flexure assemblies 52 are carefully designed and matched to minimize moments and shears at the attach points. The flexure pair provide 350 pounds nominal preload at each actuator location. The preload is based on a spring stress of thirty-five percent of material unaxial tensile strength assuring less than 2 percent "sag" during life. The flexures 52 are nominally compressed 0.055 in. on assembly to develop the required preload. By matching during fabrication and assembly prior to final optical finishing, the effects of actuator induced moments are minimized.

A mirror mount with actuators similar to the ball screw actuator of the present invention was patented in U.S. Pat. No. 4,060,314, and is included herein by reference.

A piezo-ceramic dither actuator 58, FIG. 2, in series with each of the nineteen differential ball screw actuators 22 is included in the 40 cm deformable mirror assembly described to "identify" or "tag" individual actuators 22 during the figure control operation. The dither actuator 58 is part of the actuator end spherical bearing assembly 60. The dither actuator 58 is designed to provide 30 μin. peak-to-peak mirror surface deflections at a nominal frequency of 50 Hz. When operated it will "tag" the retro intensity effects of a specific actuator motion during automated closed loop control operation.

In the preferred configuration, the dither actuator 58 comprises a bonded stack of six 0.025 in. thick piezo-ceramic elements 62 approximately 1.500 in. O.D. by 1.00 in. I.D. Four active elements sandwiched between two insulator elements produce a free deflection of 60 μin. with the application of −375 through +375 volts. The actuator stack will also generate a force up to 1400 lbs (completely restrained). Interface with the housing structure 14 and the spherical actuator end bearing 38 is supplied by machined Cres elements bonded to either side of the piezo-ceramic stack.

The dither actuator 58 and bearing assembly 60 interface with the housing structure 14 against a precision reflecting surface 16 through which reaction loads are transmitted. Position retention is achieved by a precision bore and shear pin 64 at the interface. The dither actuator 58 and bearing assembly 60 are preloaded in compression by the reaction of loads generated by the flexures 52 and transmitted through the ball screw 22.

In operation, a deflection produced by application of a voltage to the piezo-ceramic dither actuator 58 moves the entire ball screw assembly 22 which in turn produces a deflection of the reflecting surface 16 centered on the actuator location. Since the resonant frequency of the reflecting surface 16 (above 1400 Hz) and actuator assembly 22 (above 300 Hz) are much higher than the operating frequency of 50 Hz, the structural transmissibility of the system is nearly 100 percent. Design dither deflections are obtained with from 3 to 6 watts of power depending upon face deflection and position.

The location of the dither actuator 58 was chosen to ensure ease of assembly and replacement should attention be required in the fully optically figured and assembled mirror 10. An individual dither actuator assembly 58 can readily be replaced and actuator compensating adjustments made without disturbing the other actuators or the mirror figure. The required access is provided by removal of the stepping motor 24 at the desired actuator location, thereby exposing the spline retaining nut 66, spherical bearing retaining nut 44, and the three torque lock screws. Rotating the ball screw 22 relieves the load on the dither actuator assembly 58, permitting removal and reassembly with proper standard adjustments being made to establish the original nominal actuator position.

It should additionally be noted that the piezo-ceramic dither actuator 58 can be used for real time dynamic corrections and not merely for tagging. This can be accomplished by the use of additional piezo-ceramic elements 62 or, if the real time dynamic corrections are extremely small, the above-described piezo-ceramic dither actuator 58 could be used in an "as is" condition.

Obviously, many modifications and variations of the present invention are possible in light of the above teachings. It is therefore to be understood that, within the scope of the appended claims, the invention may be practiced otherwise than as specifically described.

What is claimed and desired to be secured by Letters Patent of the United States is:

1. A deformable mirror for correcting wavefront aberrations in a laser fusion optical system, which comprises:
   support means;
   at least one ball screw mirror actuator interconnected with said support means;
   a faceplate, which comprises:
      a reflecting surface for reflecting a signal; and
      a flex strut mounted at one end to said reflecting surface and at the other end to said ball screw mirror actuator; and
   a dither actuator connected in series with said ball screw mirror actuator for either tagging or for real time dynamic correction.

2. The deformable mirror of claim 1 wherein said dither actuator comprises a plurality of piezo-ceramic elements.

3. The deformable mirror of claim 2 wherein there are four active and two inactive piezo-ceramic elements.

4. A deformable mirror for correcting wavefront aberrations in a laser fusion optical system, which comprises:
   support means;
   at least one ball screw mirror actuator interconnected with said support means and connected through its aft end to a stepping motor and through its forward end to a flex strut;
   a faceplate, which comprises:
      a reflecting surface for reflecting a signal; and
      a flex strut mounted to one end to said reflecting surface and at the other end to said ball screw mirror actuator; and
   a dither actuator connected in series with said ball screw mirror actuator for either tagging or for real time dynamic correction.

5. The deformable mirror of claim 4 wherein said dither actuator comprises a plurality of piezo-ceramic elements.

6. The deformable mirror of claim 5 wherein there are four active and two inactive piezo-ceramic elements.

7. A deformable mirror for correcting wavefront aberrations in a laser fusion optical system, which comprises:
   support means;

a motor interconnected with said support means;
at least one ball screw mirror actuator connected through an aft end to said motor;
a faceplate, which comprises:
 a reflecting surface for reflecting a signal; and
 a flex strut mounted to a forward end of said ball screw mirror actuator, which comprises a receiving portion for receiving said ball screw mirror actuator and a necked-down portion integrally connected between said receiving portion and said reflecting surface.

8. The deformable mirror of claim 7 wherein said flex strut imposes no more than 54 $\mu$rad distortion out of 290 $\mu$rad deflection for a mirror having nineteen ball screw mirror actuators comprising a center row and an outer row on said faceplate, said distortion occurring when said center and outer rows are at full stroke.

9. The deformable mirror of claim 7 wherein said flex strut further comprises a stand-off thickness portion integrally connected between said necked-down portion and said reflective surface.

* * * * *